United States Patent
Ruutu et al.

(10) Patent No.: US 6,456,237 B1
(45) Date of Patent: *Sep. 24, 2002

(54) METHOD OF MEASURING TIME DIFFERENCE, AND RADIO SYSTEM

(75) Inventors: Ville Ruutu, Espoo; Timo M. Rantalainen, Helsinki; Marko Aulis Alanen, Tampere; Gudni Gunnarsson, Espoo; Olli Heikki Antero Hyvärinen, Tampere, all of (FI)

(73) Assignee: Nokia Networks Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/677,114

(22) Filed: Sep. 29, 2000

Related U.S. Application Data

(63) Continuation of application No. PCT/FI99/00264, filed on Mar. 30, 1999.

(30) Foreign Application Priority Data

Mar. 31, 1998 (FI) .................................................. 980724

(51) Int. Cl.[7] .............................. G01S 1/24; G01S 3/02
(52) U.S. Cl. ....................................... 342/387; 342/457
(58) Field of Search ............................... 342/457, 387; 455/456

(56) References Cited

U.S. PATENT DOCUMENTS 3,848,254 A * 11/1974 Drebinger et al. .......... 342/387
5,510,801 A * 4/1996 Engelbrecht et al. ........ 455/457
5,600,706 A * 2/1997 Dunn et al. ................. 342/457
6,108,558 A * 8/2000 Vanderspool, II ........... 455/456

FOREIGN PATENT DOCUMENTS

| EP | 0 241 565 | 10/1987 |
| WO | WO 89/04002 | 5/1989 |
| WO | WO 96/35306 | 11/1996 |

OTHER PUBLICATIONS

Lopes, L. et al, "GSM Standards Activity on Location", IEE Colloquium on Novel Methods of Location and Tracking of Cellular and their Application, May 1999, pp. 7/1–7/7.*

Siemens Telecom Networks, "Downlink TDOA with Position Computation in the Handset" T1P1.5 PCS 1900 Standards, Mar. 1998, pp. 1–5.*

Silventoinen, Marko et al, "Mobile Station Emergency Locating in GSM", IEEE International Conf. on Personal Wireless Communications, Feb. 1996, pp. 232–238.*

* cited by examiner

*Primary Examiner*—Gregory C. Issing
(74) *Attorney, Agent, or Firm*—Altera Law Group, LLC

(57) ABSTRACT

The invention relates to a method of measuring a time difference and a radio system employing the method, the radio system comprising base stations, terminals, time difference units and a time difference centre. A real time difference of the base station is formed on the basis of measurements carried out by the time difference units by means of an observed time difference and a geometrical time difference in the time difference centre as a function of time, in which case the moment of occurrence of the real time difference measured is connected to the real time difference RTD of the base station.

22 Claims, 2 Drawing Sheets

METHOD OF MEASURING TIME DIFFERENCE, AND RADIO SYSTEM

This application is a continuation of international application serial number PCT/FI99/00264, filed Mar. 30,1999.

FIELD OF THE INVENTION

The invention relates to a method of measuring a time difference, the method being used in a radio system comprising at least two base stations and a terminal, in which radio system an observed time difference OTD of the base stations is measured and a geometrical time difference GTD is calculated.

BACKGROUND OF THE INVENTION

In known radio systems timing of a signal coming from a transmitter to a receiver can be measured particularly for the purpose of locating a terminal. In a terminal location system based on measuring a signal of a base station, the terminal measures an observed time difference OTD of the arrival of signals of at least two, or preferably at least three, base station pairs. By assuming that the base stations transmit synchronously, i.e. the same signals leave the base stations simultaneously, the observed time difference at reception of the signals which arrive from the two base stations corresponds to the distances of the base stations, i.e. the observed time difference is a geometrical time difference GTD. In that case, as the location of the base stations is typically fixed and known, hyperbolas can be formed by means of the differences in signal propagation times, and the terminal is to be located at the intersection of the hyperbolas on the basis of the measurements. A drawback of such a measurement is that the transmissions of the base stations are not completely synchronous.

Signals of base stations can be measured by means of time difference units which have a known location and can be used for determining a real time difference of the transmissions of the base stations. The RTD in question can be further utilized when the terminal measures the observed time difference OTD of the base stations, since the real time difference RTD of the base stations can be subtracted from the observed time difference OTD measured by the terminal. However, since the observed time difference OTD measured by the terminal and the real time difference RTD of the base stations, measured by the time difference unit, are measured at different times due to a delay created by a data transmission channel, for example, the measurement of the geometrical time difference GTD still contains errors, which brings about inaccuracy in the location determination of the terminal.

BRIEF DESCRIPTION OF THE INVENTION

An object of the invention is thus to provide a method of measuring a time difference and a radio system implementing the method so as to solve the above problems associated with the accuracy of the time difference.

This is achieved with a method of the type presented in the introduction, which is characterized in that the real time difference RTD of the base stations is formed by means of the observed time difference OTD and the geometrical time difference GTD as a function of time by connecting the moment of occurrence of the measured real time difference RTD to the real time difference RTD of the base stations.

The invention also relates to a radio system comprising at least two base stations and a terminal, a time difference unit arranged to measure an observed time difference OTD of the base station, and a time difference centre whereto the time difference unit is arranged to transmit its measuring information, and which radio system has information available on geometrical time differences GTD of the base stations. The radio system is characterized in that the time difference centre is arranged to form a real time difference RTD of the base stations as a function of time by utilizing the observed time difference OTD and the geometrical time difference GTD calculated in a manner such that the time difference centre is arranged to connect the moment of occurrence of the real time difference RTD to the real time difference RTD.

The method and system of the invention provide many advantages. The measurement of the real time difference RTD and the observed time difference OTD measured by the terminal can be matched in time, thereby making it possible to reduce the error caused by the real time difference RTD. Hence, the terminal can be located more accurately as compared with the prior art.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
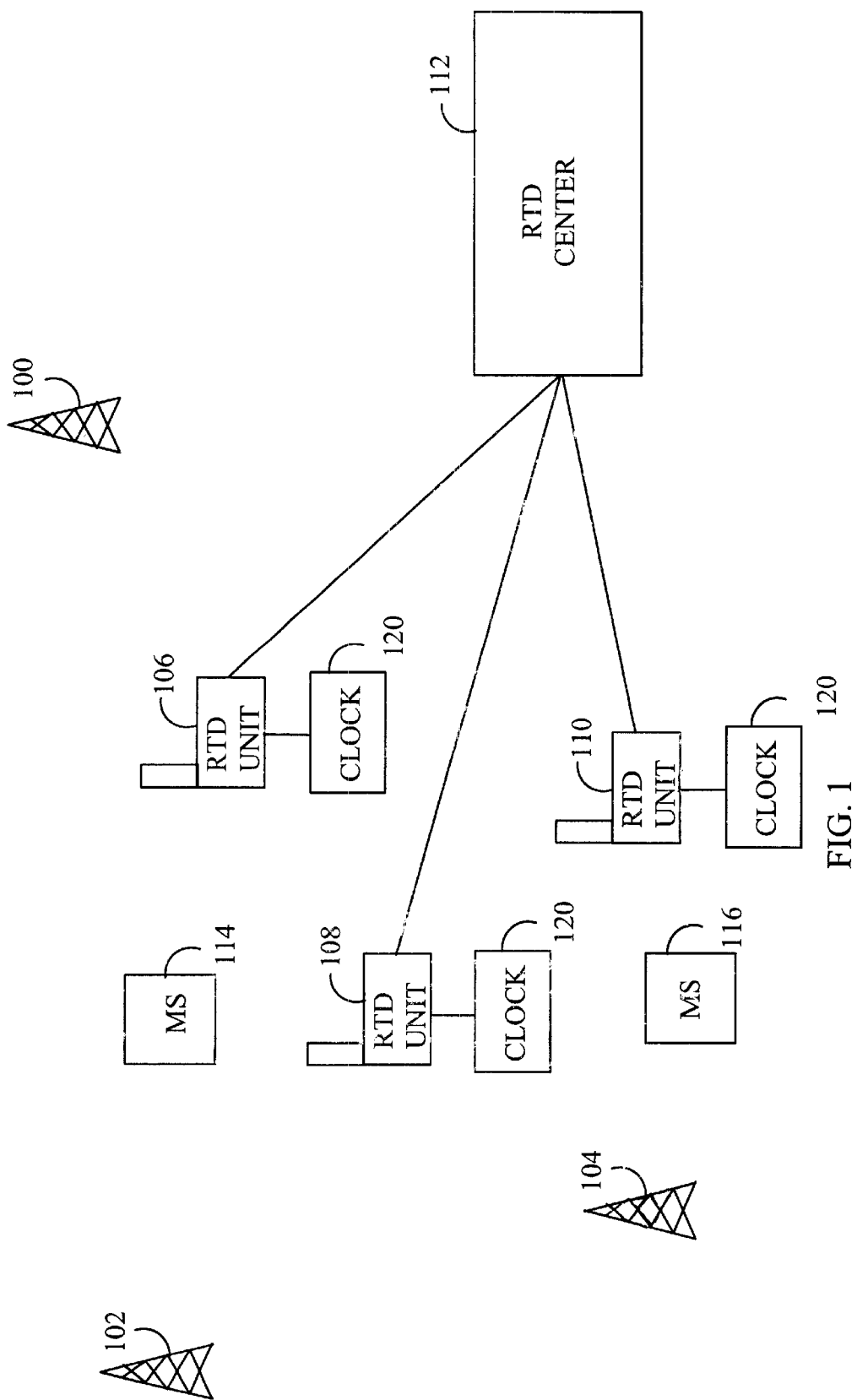
FIG. 1 shows a radio system.

FIG. 1 shows a radio system of the invention, such as a GSM radio system without, however, restricting to it. The radio system comprises base stations 100 to 104, time difference units 106 to 110, a time difference centre 112 and terminals 114, 116. The time difference units 106 to 110 are typically immobile receivers which listen to the transmission of the base stations 100 to 104 and measure an observed time difference of the base stations. The oboe served time difference OTD is formed of a real time difference RTD and a geometrical time difference GTD according to formula (1):

$$OTD = RTD + GTD. \tag{1}$$

The real time difference arises from the wrong timing of the operation of the base station 100 to 104. If the base stations 100 to .104 operated completely synchronously, the real time difference RTD would then be zero. The geometrical time difference GTD arises from the distances between the base stations 100 to 104 and time difference units 106 to 110. As the location of the base stations 100 to 104 and the time difference units 106 to 110 is known, the geometrical time difference GTD can be once calculated theoretically or on the basis of practical measurements, whereupon the same result is always available in the time difference centre 112, for example. The time difference centre 112 receives the observed time differences OTD measured by the time difference units 106 to 110 and forms the real time difference RTD of each base station pair 100 to 104 by subtraction. The time difference centre 112 also connects the moment of occurrence of the real time difference, possibly the measurement time or the like, to each real time difference RTD formed. This specifies information of the real time difference RTD of the base station 100 to 104 and at the same time it is also possible to specify other information formed by means of the real time difference RTD as compared with he prior art. When determining the moment of occurrence, the time difference centre 112 may also utilize the occurrence of the observed time difference OTD in the time difference unit 106 to 110, in which case the time difference unit 106 to 110 informs the time difference centre 112 of the observed time difference OTD and the measurement time.

The time difference unit 106 to 110 is preferably so located in a cell that it can directly communicate with an antenna of the base station 100 to 104. The cell may comprise one or more time difference units 106 to 110. The antenna, or antennas, of the time difference unit 106 to 110 may be nondirectional or directional, by means of which the time difference unit 106 to 110 listens to all transmissions of the base station 100 to 104 by using a digital broadband receiver.

The time difference centre 112 is typically also a location centre of the terminal 114, 116 and is preferably located in a mobile services switching centre (not shown in FIG. 1). The time difference centre 112 controls the time difference units. Consequently, the time difference units 106 to 110 and the time difference centre 112 form a real time difference RTD determination system, and the system together with the location centre and the units (such as terminals, base stations or time difference units which, in addition to the base stations, can receive transmissions from the terminal) carrying out actual location measurements can form a location system for the terminal 114 to 116. The location system can utilize the real time difference of the base station in a manner such that the location system utilizes the observed time difference OTD of the base station 100 to 104, measured by each subscriber terminal 114, 116, and the location system, i.e. preferably the time difference centre 112, subtracts the real time difference RTD from the observed time difference OTD so as to form the geometrical time difference GTD of the terminal 114, 116. When the location system knows the geometrical time difference GTD associated with at least two of the base stations 100 to 104, the location coordinates of the subscriber terminal 114, 116 can be determined in accordance with the prior art by means of the location co-ordinates of the base stations 100 to 104 and the geometrical time difference GTD.

The time difference unit 106 to 110 preferably comprises a specific clock 120 by means of which the time difference unit 106 to 110 is arranged to measure the observed time difference OTD. If the clocks 120 of the different time difference units are synchronized with a sufficient accuracy, the measurement time can be connected to each observed time difference measurement OTD. Instead of the clock 120, or in addition thereto, frame numbers can preferably be used in the radio system, and the time difference unit 106 to 110 time stamps the measurements by means of the frame numbers. Time information can also be transmitted in the radio system on a control channel, for example, whereupon the time difference unit 106 to 110 is able to time stamp the measurements by means of the time information.

Figure 2:
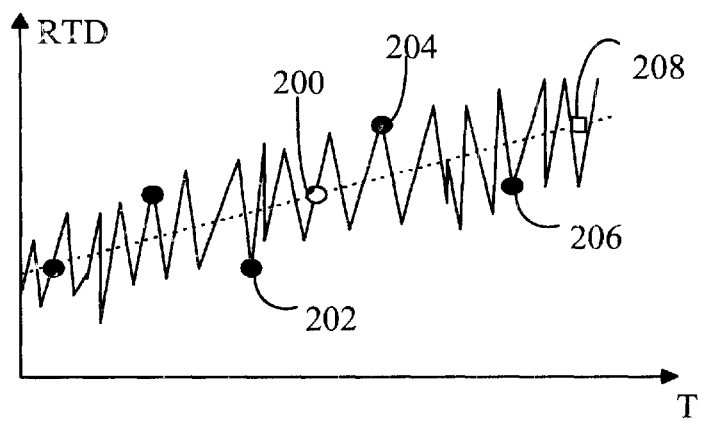
FIG. 2 shows the change of a real time difference of a base station as a function of time.

FIG. 2 graphically shows a typical series of measurement carried out by the time difference centre 112. The time difference centre 112 interpolates and extrapolates, by means of real time differences RTD measured, the behaviour of the real time difference RTD of the base station 100 to 104 at times other than the measurement time. The processing of the real time difference RTD results is possible and effective, because each real time difference RTD result forms a pair with a given time instant. In other words, the measurements of the real time difference RTD take place as a function of time and therefore do not form a set of real time difference RTD results without a connection to time. A white dot 200 indicates an interpolated value of the real time difference RTD between measuring points 202 and 204. A white square 208, in turn, represents an extrapolated value of the real time difference RTD after the last measuring point 206 of a time window. The time difference centre 112 preferably also filters and averages the measured real time differences RTD in a predetermined time window. This can be done only because the measurement results of the real time difference RTD are functions of time. A dashed line indicates the mean value of the real time difference RTD as a function of time, and it can be calculated in a known manner as a least-squares sum which can be. indicated by a straight line. The location system of the terminal may use the measured real time difference RTD of the base station 100 to 104 with the closest moment of occurrence, or the interpolated or extrapolated value of the real time difference RTD.

Figure 3:
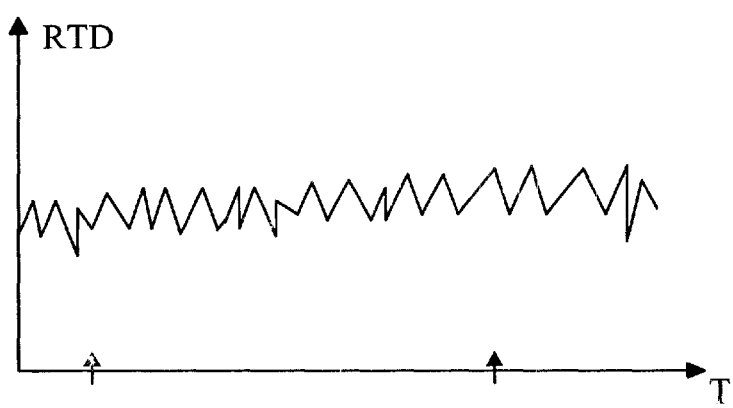
FIG. 3A shows a slow change of a real time difference of the base station as a function of time and the need for measurement.
FIG. 3B shows a rapid change of a real time difference of the base station as a function of time and the need for measurement.
Figure 3:
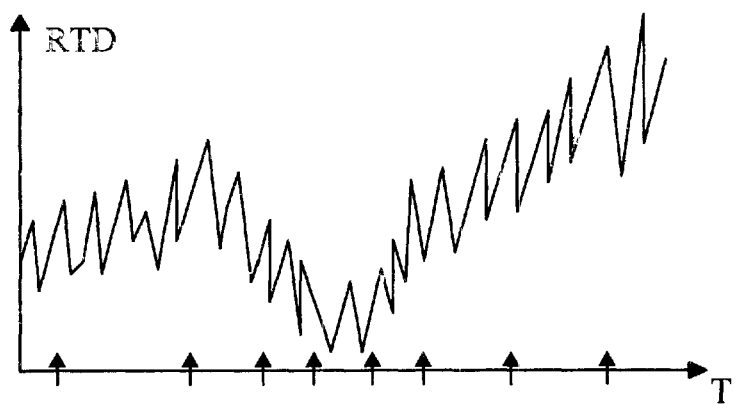

In FIG. 3A the real time difference RTD of the base station 100 to 104 changes slowly as a function of time. In that case, the time difference unit 106 to 110 has to measure the real time difference RTD regularly but relatively seldom. In FIG. 3A, two arrows indicate measuring times. In FIG. 3B the real time difference of the base station 100 to 104 changes rapidly as a function of time. In that case the time difference unit 106 to 110 has to measure the real time difference RTD irregularly and, at least sometimes, rather frequently. In FIG. 3B, arrows indicate measuring times. The time difference centre 112 decides on the basis of its measurements how often and how regularly the time difference unit 106 to 110 measures each base station 100 to 104. The frequency of measurements may be based on the rate at which the mean value of the real time difference RTD changes, for example. A possibility of changing the frequency of measurements reduces the need for signaling of the measurement results and, consequently, the signaling load of the radio system.

In the GSM radio system the time difference centre 112 may transmit the real time difference information and information on the moment of occurrence of the time difference in a short message, for example, to the network elements requiring the information. In addition to the time difference information, or instead of them, the message may comprise information on the location of the terminal 114, 116. In the solution of the invention the time difference units 106 to 110 and the time difference centre 112 can be placed in the radio system in a desired manner, in connection with base stations, for example. The functions of the time difference centre 112 can at least to some extent be distributed over the time difference units 106 to 110.

Although the invention is described above with reference to the example according to the accompanying drawings, it is obvious that the invention is not restricted thereto but can be modified in many ways within the inventive idea disclosed in the attached claims.

What is claimed is:

1. A method of measuring a time difference, the method being used in a radio system including at least two base stations and a subscriber terminal, the method comprising:
   transmitting signals from at least two base stations;
   receiving the signals transmitted by the base stations;
   measuring a first observed time difference of the received signals;
   calculating a first geometrical time difference of the received signals; and forming a real time difference of the received signals from the first observed time difference and the first geometrical time difference as a function of time by connecting a moment of occurrence to the real time difference.

2. The method as claimed in claim 1, further comprising:
using a subscriber terminal to receive the signals transmitted by the at least two base stations;
using the subscriber terminal to measure a second observed time difference of the received signals; and
forming a second geometric time difference by subtracting the real time difference from the second observed time difference corresponding thereto in time to determine a location of the subscriber terminal.

3. The method as claimed in claim 1, wherein the radio system includes at least a time difference unit and a time difference centre, the time difference unit measuring the first observed time difference and transmitting the first observed time difference to the time difference centre, the time difference centre forming the real time difference from the first observed time difference and the first geometrical time difference as a function of time, wherein the time difference centre interpolates and extrapolates from the real time difference the behaviour of real time differences at times other than the moment of occurrence.

4. The method as claimed in claim 3, wherein the time difference unit comprises a clock to measure the real time difference and the moment of occurrence of the real time difference.

5. The method as claimed in claim 3, wherein the time difference centre filters and averages the measured real time differences in a predetermined time window.

6. The method as claimed in claim 3, wherein the time difference centre controls a reporting frequency of the first observed time differences in accordance with a rate at which an average value of the real time difference changes.

7. The method as claimed in claim 2, wherein in a GSM radio system the time difference centre transmits the real time difference, the moment of occurrence of the real time difference and/or the location of the subscriber terminal in a short message.

8. The method as claimed in claim 1, wherein in a radio system where transmission is carried out in frames, the moment of occurrence of the real time difference is referenced to timing frame numbers.

9. The method as claimed in claim 8, wherein in the radio system, timing information is transmitted on a control channel, the timing information being used by the time difference unit to measure the real time difference and determine the moment of occurrence of the real time difference.

10. The method as claimed in claim 1, wherein the real time difference is measured at predetermined intervals.

11. The method as claimed in claim 2, wherein determination of the location of the subscriber terminal uses the real time difference having the closest moment of occurrence relative to the second observed time difference.

12. A radio system comprising:
at least two base stations and a subscriber terminal, wherein the at least two base stations transmit a signal;
a time difference unit to receive the base station signals and to measure a first observed time difference between the base station signals; and
a time difference centre whereto the time difference unit transmits the first observed time difference, the time difference centre having information available on a first geometrical time difference between the at least two base stations, wherein the time difference centre forms a real time difference as a function of time by utilizing the first observed time difference and the first geometrical time difference calculated in a manner such that the time difference centre connects a moment of occurrence of the real time difference to the real time difference.

13. The radio system as claimed in claim 12, wherein the radio system further comprises a location system of the subscriber terminal and the location system is arranged to utilize the real time difference in a manner such that the subscriber terminal is arranged to measure a second observed time difference between the base station signals, and the location system is arranged to subtract the real time difference from the second observed time difference so as to form a second geometrical time difference of the subscriber terminal to determine the location of the subscriber terminal.

14. The radio system as claimed in claim 12, wherein the time difference unit comprises a clock to measure the real time difference.

15. The radio system as claimed in claim 12, wherein the time difference centre is arranged to interpolate and extrapolate by means of the real time difference the behaviour of real time differences at times other than the moment of occurrence.

16. The radio system as claimed in claim 12, wherein the time difference unit uses frame numbers to time stamp the measurement of the real time difference.

17. The radio system as claimed in claim 12, wherein the radio system is arranged to transmit time information on a control channel and the time difference unit is arranged to time stamp the measurement of the real time difference using the time information.

18. The radio system as claimed in claim 12, wherein the time difference centre is arranged to measure the real time difference at predetermined intervals.

19. The radio system as claimed in claim 12, wherein the time difference centre is arranged to filter and average measured real time differences in a predetermined time window.

20. The radio system as claimed in claim 12, wherein the time difference centre controls a reporting frequency of the first observed time differences in accordance with a rate at which an average value of the real time difference changes.

21. The radio system as claimed in claim 13, wherein the radio system is a GSM radio system in which short messages are transmitted and the time difference centre is arranged to transmit a short message which comprises the real time difference, the moment of occurrence associated with the real time difference and/or the location of the subscriber terminal.

22. The radio system as claimed in claim 13, wherein the location system of the subscriber terminal is arranged to use the real time difference that is closest in time relative to the second observed time difference.

* * * * *